(12) United States Patent
Fields

(10) Patent No.: US 6,687,186 B1
(45) Date of Patent: Feb. 3, 2004

(54) SONOBUOY DEPLOYMENT METHOD

(75) Inventor: Joel P. Fields, Charlotte Hall, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/436,606

(22) Filed: May 9, 2003

(51) Int. Cl.$^7$ ................................................. H04B 1/59
(52) U.S. Cl. ................................... 367/4; 367/3; 367/5
(58) Field of Search ................................. 367/2, 3, 4, 5

(56) References Cited

U.S. PATENT DOCUMENTS

| | | | | |
|---|---|---|---|---|
| 3,582,871 A | * | 6/1971 | Snyder ........................ | 367/3 |
| 3,783,441 A | * | 1/1974 | Slawsky ...................... | 367/5 |
| 5,056,065 A | | 10/1991 | Bruengger ................... | 367/4 |
| H1618 H | | 12/1996 | Blume ......................... | 367/5 |
| 5,995,445 A | | 11/1999 | Whitesell et al. ............ | 367/5 |
| 6,082,675 A | | 7/2000 | Woodall, Jr. et al. ....... | 244/137.4 |

* cited by examiner

Primary Examiner—Ian J. Lobo
(74) Attorney, Agent, or Firm—Mark Homer

(57) ABSTRACT

A method of deploying sonobouys includes providing an airborne aircraft having a computer and a plurality of sonobouys; making a contact with a submarine; determining a position of the submarine, a position error of the submarine and a speed of the submarine; inputting into the computer the airborne aircraft speed, a distance from the airborne aircraft to the submarine, the position error of the submarine, and a sonobuoy detection range; computing a flight time and flight distance to a first sonobuoy drop; computing a flight time, a flight distance and an airborne aircraft course to each subsequent sonobuoy drop to encircle the submarine with sonobuoys; displaying a total number of sonobuoys needed, a total flight time to deploy the total number of sonobouys and a total flight distance to deploy the total number of sonobouys; deploying a first sonobuoy; and deploying additional sonobouys until the total number of sonobouys has been deployed.

5 Claims, 5 Drawing Sheets

SONOBUOY DEPLOYMENT METHOD

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to methods of deploying sonobuoys and in particular to methods of deploying sonobuoys to encircle a target, such as a submarine.

Aircrews need an easy- to- use tool for determining where and when to deploy sonobouys such that a contact, such as a submarine, is encircled. The aircrew has information concerning submarine contact location relative to the aircraft, the error associated with that contact location, the sonobouy detection radius, the aircraft speed and the submarine's estimated speed. What is needed is way to determine: 1) how many sonobouys are needed to accomplish the encirclement protocol; 2) how long and what distance will be flown to accomplish the protocol; and 3) the course and flight times for each sonobouy drop.

In one prior method, the aircrew estimates the largest circular area within which the submarine may be. This is done with pencil and paper. The buoys are then dropped by aircrew estimate. The aircrew continuously adjusts their estimate of the position uncertainty of the submarine to estimate where and when they will drop the buoys. This method is difficult to use because the pencil and paper calculations are performed while the helicopter is flying very low over the water and requires the aircrew to divert their attention from the outside situation. Another limitation of the prior method is that all the computations are estimates. The aircrew easily may find themselves dropping the buoys only to discover at a very late time that they do not have enough sonobouys to complete the encirclement protocol.

SUMMARY OF THE INVENTION

The invention is a method for deploying sonobouys that includes the use of a computer. The computer may be a hand held computer or a computer that is part of the deploying aircraft computer system. The deploying aircraft's cruise speed and the sonobuoy detection radius are input into the computer. When the submarine contact is made, the aircrew inputs into the computer the position of the submarine relative to the aircraft (range) and the submarine estimated speed.

When the computer is instructed to "run", a computer display shows the number of sonobouys to be used, the flight time to the first sonobouy drop, and the total time and flight distance to be used to accomplish the encirclement protocol. An important advantage of the invention is that the aircrew can decide whether or not to continue the encirclement tactic while traveling to the first bouy drop. When the computer is instructed to "run" again, the computer display shows the course and flight times to the second, third, and remaining sonobuoy drops.

The inventive method can be accomplished by one aircrewman, without diverting attention of the pilot from flying duties. In addition, the method yields a definitive answer to the key question of how many sonobuoys are needed. The invention quickly yields definitive answers rather than estimates. Furthermore, the invention contributes to improved flight safety by avoiding "eyes in the cockpit" over a prolonged time.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

An initial submarine contact is made, for example, by a long range fixed wing aircraft such as the P-3 Orion. The P-3 Orion can make the initial contact using sonar bouys (underwater sonar arrays emplaced at various locations on the sea bed) or magnetic anomoly detection (MAD) equipment. Presumably, one knows where the friendly submarines are operating so the contact is treated as unknown, possibly hostile. The intent is to be able to maintain the contact such that a homing torpedo drop solution can be generated.

The submarine speed may be estimated from known data on various classes of submarines such as the best cruising speed or the speed that is optimum to keep noise (acoustic signature) to a minimum. If contact was made by a P-3 with its sonar bouys, then it may be that the acoustic signature of the contact will yield a propeller RPM that can be translated into submarine speed.

The "known" values to be used in the inventive method are: 1) submarine estimated position (datum) and error associated with the position estimate; 2) estimated submarine speed; 3) known aircraft speed (the aircraft that is deploying the sonobouys); and 4) sonobuoy detection radius. The unknown values that the method of the invention provides are: 1) the number of sonobouys needed to encircle the submarine's possible locations; 2) the flight time and distance to perform the encircling protocol; and 3) the position of each sonobuoy and the aircraft courses to be flown to deploy the sonobouys.

The unknown values are determined using the approach of a Cartesian coordinate system. In X, Y coordinates, the submarine's estimated first position (datum) will be taken as the origin (0, 0). The positive Y axis is defined as the initial datum-aircraft line. The positive X axis is defined as right hand when viewed from the aircraft at the time of establishment of the datum.

The variables include:

$V_T$=Submarine (target) estimated speed,
$V_A$=Aircraft speed;
$R_D$=Sonobouy detection range;
$R_E$=Error of Submarine location;
$X_T$=Aircraft position relative to Datum (X coordinate);
$Y_T$=Aircraft position relative to Datum (Y coordinate);
$t_n$=time where subscript n refers to the sonobuoy drop number, that is, where 1 equals the first drop, 2 the second drop, etc.

Figure 1:
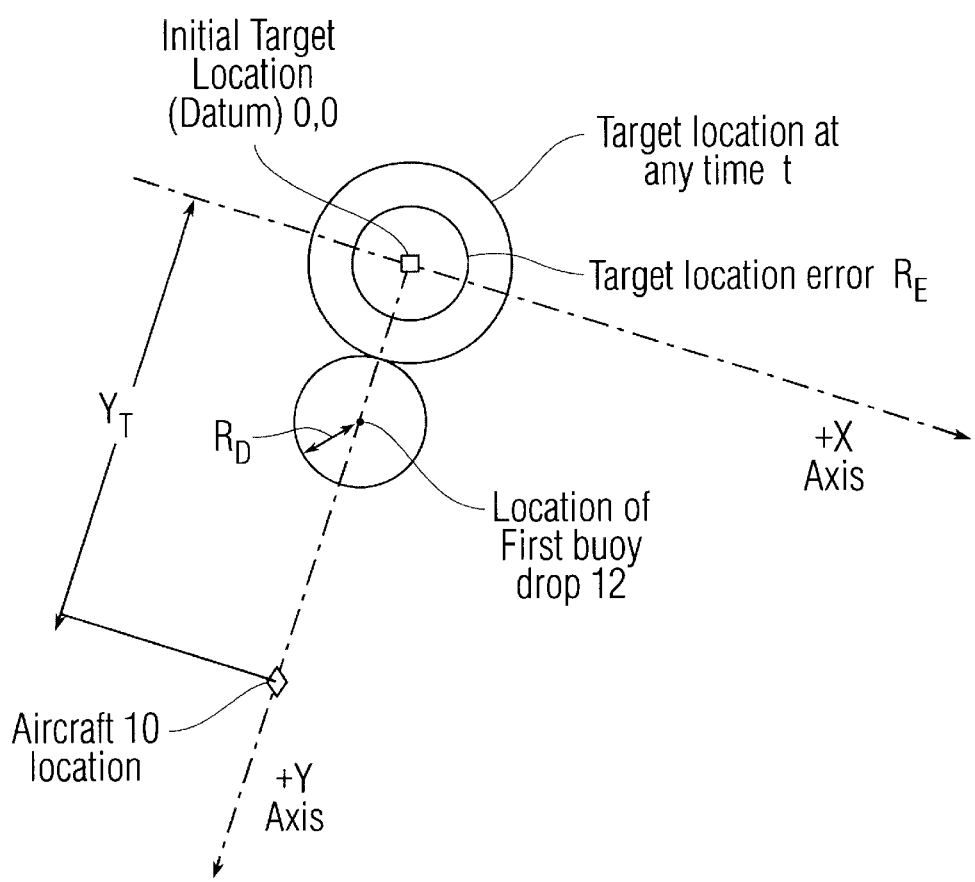
FIG. 1 illustrates the geometry at the time that the submarine contact report is received

FIG. 1 illustrates the geometry at the time that the submarine contact report is received by the aircraft 10. The coordinate axis system has its origin 0,0 at the submarine initial position (datum), the+Y axis is the aircraft—datum line and the+X axis is the line perpendicular the Y axis and "right handed" as viewed from the aircraft 10.

The aircraft 10 heads directly for the datum 0,0 to make the first sonobuoy drop. First, we solve for time and distance to the first sonobuoy drop 12. We then solve for the course change relative to the aircraft 10-datum line and the time to the second, third and successive sonobuoy drops. The inventive method provides, for example, the following information on a computer display:

First display: Number of sonobouys needed to completely the encircle of the submarine;
  The time and total flight distance to complete the encirclement;
  The time to the first sonobuoy drop 12.
Second display: The course (angle) relative to the aircraft 10-datum line;
  The time to the second, third, and successive sonobuoy drops.

The time to the first sonobuoy drop 12 may be derived from FIG. 1:

$$Y_T - R_D - (R_E + V_T t_1) = V_A t_1$$

Solving for the time of the first drop:

$$t_1 = (Y_T - R_D - R_E)/(V_A + V_T).$$

The coordinates of the first sonobuoy drop 12 are (0, $V_T t_1 + R_E + R_D$).

Figure 2:
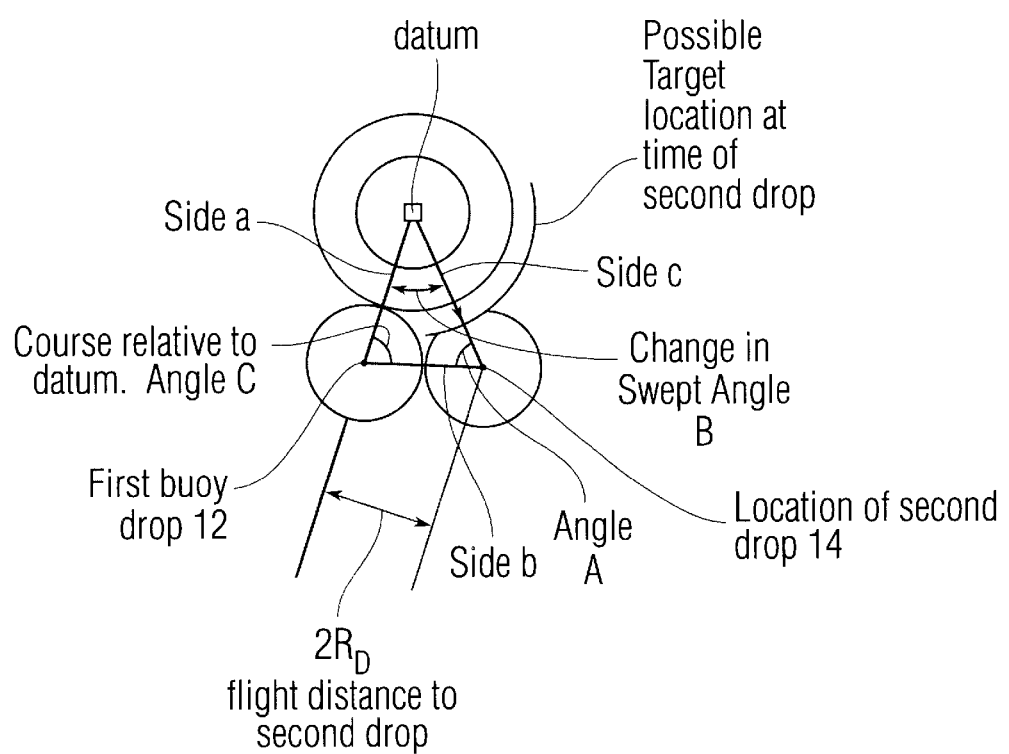
FIG. 2 illustrates the geometry for sonobuoy drops after the first drop.

FIG. 2 illustrates the geometry for sonobuoy drops after the first drop, that is, the second thru the $n^{th}$ drops. Referring to FIG. 2, the conditions for the second drop 14 are shown The aircraft 10 flight distance to the second drop 14 is equal to 2 ($R_D$) (it is assumed that each sonobuoy drop is made such that the sonobuoy detection radii are tangent). The flight time to the second drop, $t_2$, is equal to 2 ($R_D$)/$V_A$, and the submarine now can be anywhere inside of a circle whose radius is $R_E + V_T (t_{1+t2})$. We use the equations below to solve for the aircraft 10 course that is to be flown for time $t_2$, relative to the aircraft-datum line, and the "change in the swept angle" B. The swept angle B is the angle defined by the aircraft-datum line and the line from the datum to the position of the next sonobouy drop.

The method continues by constructing a succession of similar triangles to solve for the third, fourth, through $n^{th}$ drops. We solve for the change in the swept angles B of these triangles. That change in angle is defined as the angle formed by the aircraft-datum line at the $(n-1)^{th}$ drop and the $n^{th}$ drop. When the sum of the changes in the swept angle B is equal to or greater than 360 degrees, the encirclement tactic is complete. We will know the number of sonobuoys, the sonobuoy positions, and the flight time to execute the sonobuoy drops.

Referring again to FIG. 2, the triangle with sides a (datum to first buoy drop 12), b (first buoy drop 12 to second buoy drop 14) and c (datum to second buoy drop 14) are known. Use the law of cosines to solve first for B, the angle formed by the lines from the datum to the first buoy drop 12 (side a) and from the datum to the second buoy drop 14 (side c). We will then solve for C, the angle between the aircraft 10 (at the first buoy drop 12)–second buoy drop 14 line, i.e., side b, and the aircraft 10-datum line (side a).

Inserting the known distances from above we have:

$$c = R_E + V_T(t_1 + t_2), \ a = R_E + V_T t_1 + R_D, \ \text{and } b = 2 \ (R_D), \text{ where } t_2 = 2 \ (R_D)/V_A.$$

For any triangle whose sides are a, b, c, and whose angles are A, B, C (angle A is the angle opposite side a, etc.), then $c^2 = a^2 + b^2 - 2ab\cos(C)$. Therefore, the change in swept angle is angle B which is:

$$B_n = \text{arc cos } [(b_n^2 - a_n^2 - c_n^2)/-2a_n c_n].$$

When the sum of angles B is greater than or equal to 360 degrees, the encirclement computation is complete.

The angle C is the aircraft 10 course relative to the aircraft-datum line:

$$C_n = \text{arc cos } [(c_n^2 - a_n^2 - b_n^2)/(-2b_n a_n)].$$

It should be noted that although the coordinate system shown and described is right handed, i.e., the positive X axis is to the right as viewed from the aircraft, the invention may also use a left handed axis system. In that case, the aircraft turns left after dropping the first sonobuoy to fly to the location for the second sonobuoy drop.

Figure 3A:
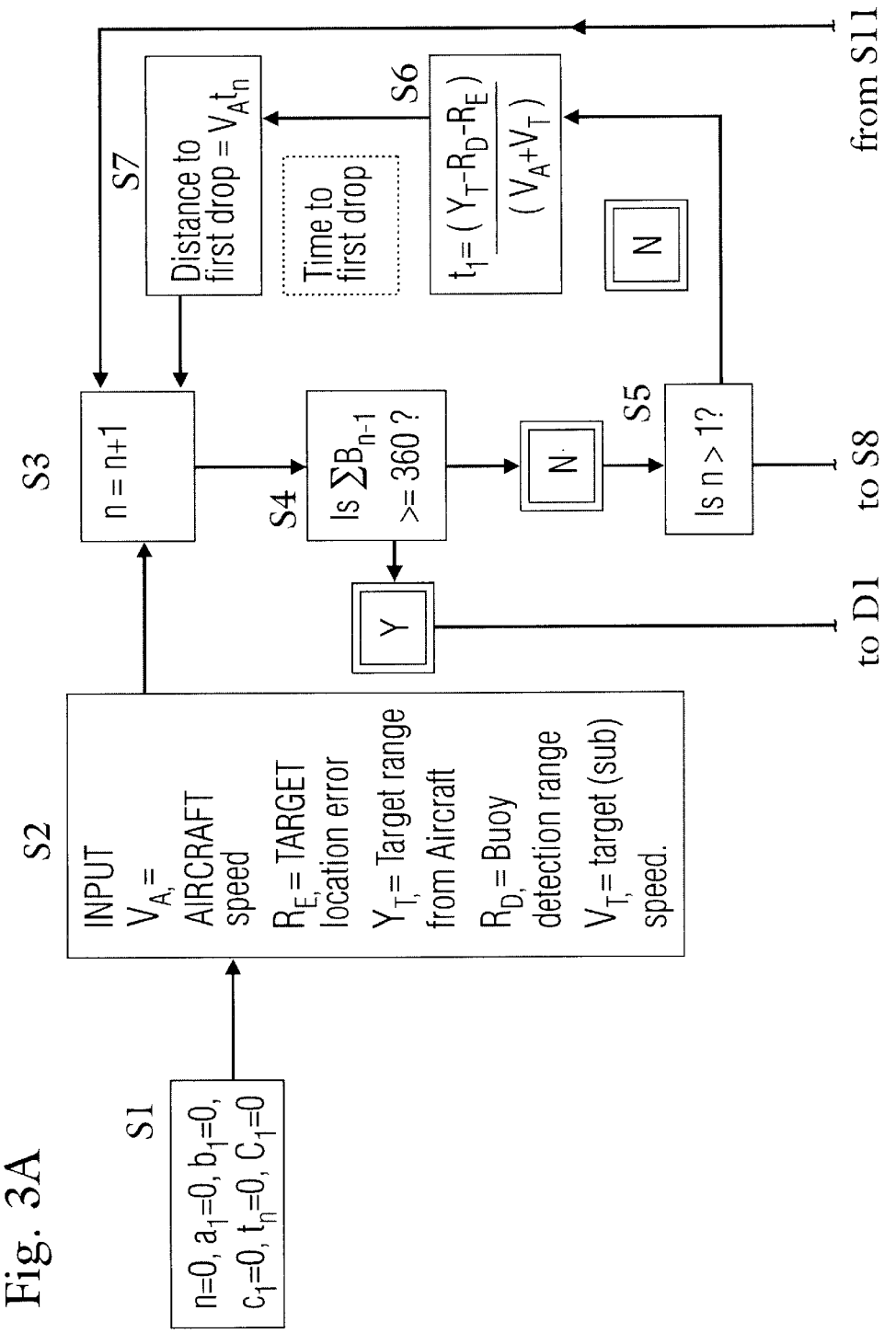
FIGS. 3A–C are a flow diagram of one embodiment of the logic used in the method.
Figure 3B:
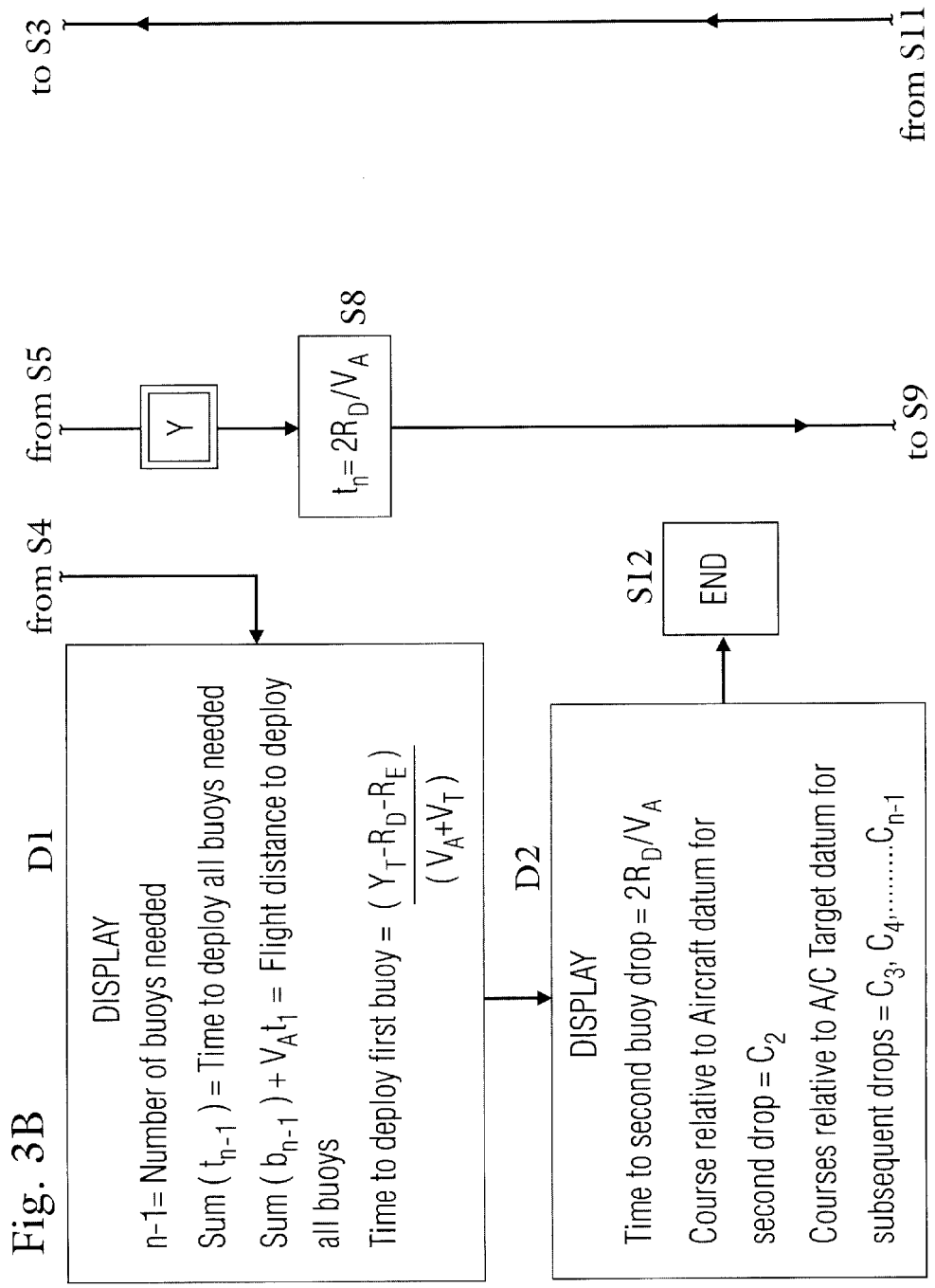
Figure 3C:
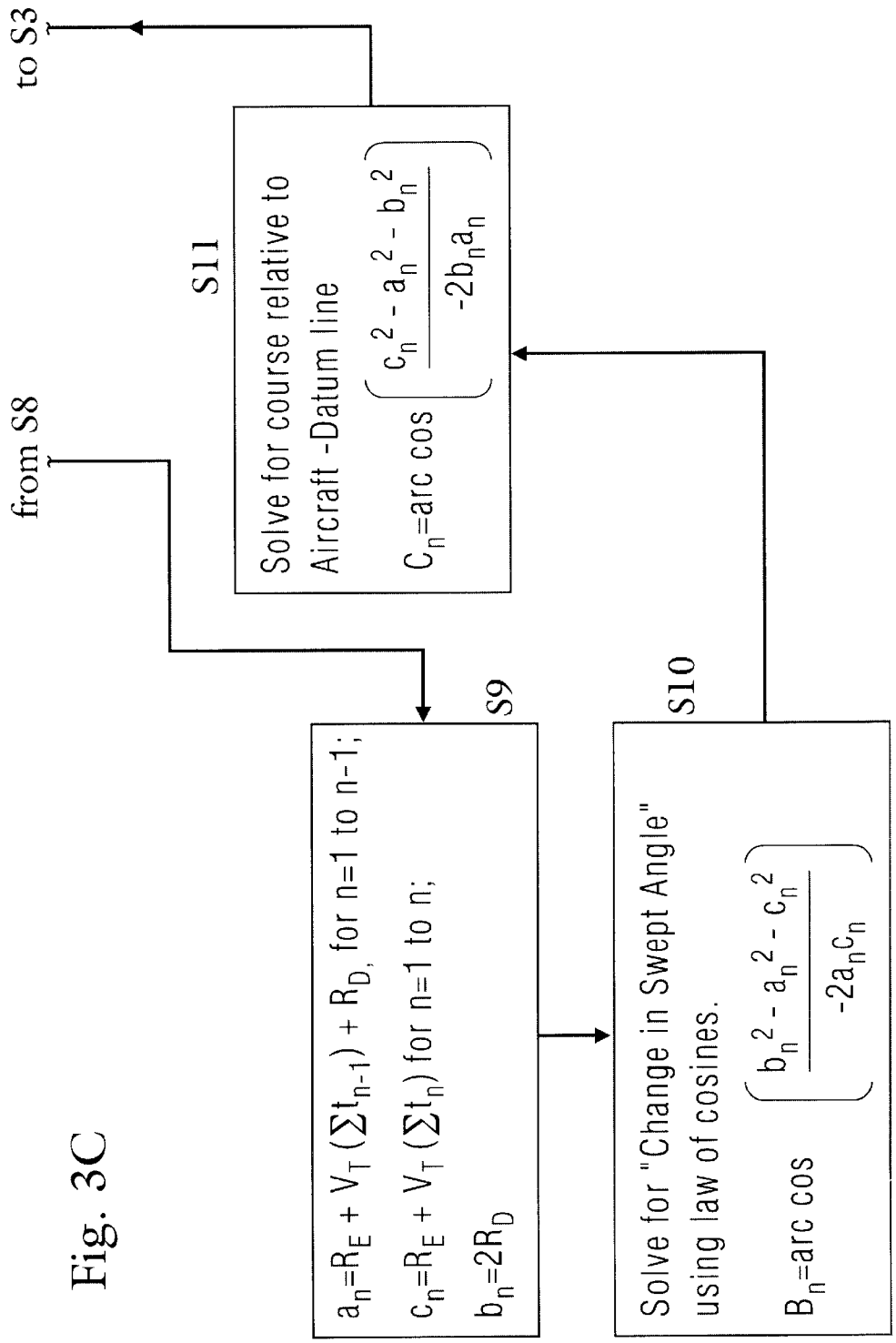

FIGS. 3A–C are a flow diagram of an embodiment of the logic used in the method. In block S1 the initial conditions are set. In block S2 various data is input into a computer. In block S3, n, which is initially 0, is incremented by 1. In block S4, a check is made to see if $\Sigma B_n$ as n varies from 1 to n–1 is greater than or equal to 360 degrees. If yes, then the flow goes to a display D1. If no, then the flow goes to block S5 where a check is made to see if n is greater than one. For the first drop only, the answer is no and the flow goes to block S6 where the time to the first drop is calculated. In block S7 the distance to the first drop is calculated and the flow returns to block S3.

Picking tip again at block S5, for the second drop and all subsequent drops, n is greater than one and the flow goes to block S8 where the time to the next drop is calculated. In block S9 the lengths of the sides a, b and c of the triangle illustrated in FIG. 2 are calculated. In block S10, the law of cosines is used to calculate the change in the swept angle B. In block S11, the law of cosines is used to calculate the angle C, which is the flight course for aircraft 10 relative to the aircraft-datum line. From block S11, the flow goes back to S3 and the process continues until in step S4, $\Sigma B_n$ as n varies from 1 to n–1 is greater than or equal to 360 degrees, wherein the flow goes to a first display D1.

The first display D1 may show the total number of sonobouys needed, which is equal to n–1; the total time to deploy all the sonobouys, which is $\Sigma t_n$ where n varies from 1 to n–1; the total flight distance to deploy all the sonobouys, which is $\Sigma b_n$ as n varies from 1 to n–1 plus $V_A t_1$; and the time to deploy the first sonobuoy, which is $(Y_T - R_D - R_E)/(V_A + V_T)$. An appropriate key on a keypad can be depressed to display a second display D2. The second display D2 may show the time to the second sonobuoy drop, which is 2(RD)/$V_A$; and the aircraft 10 course relative to the aircraft 10-datum line for the second and subsequent drops, which is $C_2, C_3, C_4. \ldots C_{n-1}$. It should be understood that other information could be displayed on the displays D1 and D2, as desired. After display D2, the flow goes to step S12, which is the end.

The embodiment of the inventive method of deploying sonobouys that has been described uses a single aircraft. However, the invention may also be used with multiple aircraft by minor modifications to the logic. With multiple aircraft, the positions of each aircraft relative to each other and to the submarine initial position are known. Additionally, an aircraft may be designated to deploy sonobouys in a given sector relative to the datum. In that case, the invention may be used to determine the times to deploy the sonobouys and the number of sonobouys needed for an aircraft in a particular sector.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of deploying sonobouys, comprising: providing an airborne aircraft having a computer and a plurality of sonobouys;

making a contact with a submarine;

determining a position of the submarine, a position error of the submarine and a speed of the submarine;

inputting into the computer the airborne aircraft speed, a distance from the airborne aircraft to the submarine, the position error of the submarine, and a sonobuoy detection range;

computing a flight time and flight distance to a first sonobuoy drop;

computing a flight time, a flight distance and an airborne aircraft course to each subsequent sonobuoy drop to encircle the submarine with sonobuoys;

displaying a total number of sonobouys needed, a total flight time to deploy the total number of sonobouys and a total flight distance to deploy the total number of sonobouys;

deploying a first sonobuoy; and deploying additional sonobouys until the total number of sonobouys has been deployed.

2. The method of claim 1 further comprising displaying a time to deploy the first sonobuoy.

3. The method of claim 2 further comprising displaying a time to deploy a second sonobuoy.

4. The method of claim 3 further comprising displaying the airborne aircraft course to deploy each additional sonobuoy.

5. The method of claim 1 wherein the step of computing the airborne aircraft course to each subsequent sonobuoy drop to encircle the submarine with sonobuoys uses the law of cosines.

* * * * *